(12) United States Patent
Sato (10) Patent No.: US 9,660,541 B2
(45) Date of Patent: May 23, 2017

(54) SWITCHING POWER SUPPLY DEVICE (71) Applicant: Rohm Co., Ltd., Kyoto (JP)

(72) Inventor: Yoshinori Sato, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 77 days.

(21) Appl. No.: 14/844,098

(22) Filed: Sep. 3, 2015

(65) Prior Publication Data
US 2016/0072391 A1    Mar. 10, 2016

(30) Foreign Application Priority Data

Sep. 4, 2014   (JP) ................. 2014-180426

(51) Int. Cl.
*H02M 3/335*    (2006.01)
*H02M 1/08*     (2006.01)
*H02M 1/00*     (2006.01)

(52) U.S. Cl.
CPC ......... *H02M 3/33515* (2013.01); *H02M 1/08* (2013.01); *H02M 3/33507* (2013.01); *H02M 3/33523* (2013.01); *H02M 2001/0032* (2013.01); *H02M 2001/0035* (2013.01); *Y02B 70/16* (2013.01)

(58) Field of Classification Search
CPC .............. H02M 2001/0032; H02M 2001/0035
See application file for complete search history.

(56) References Cited

U.S. PATENT DOCUMENTS

| | | | |
|---|---|---|---|
| 2004/0174152 A1* | 9/2004 | Hwang | H02M 1/4225 323/284 |
| 2009/0174440 A1* | 7/2009 | Man | H02M 1/44 327/114 |
| 2013/0294118 A1* | 11/2013 | So | H02M 3/33507 363/21.16 |

FOREIGN PATENT DOCUMENTS

JP    2002-315333    10/2002

* cited by examiner

Primary Examiner — Timothy J Dole
Assistant Examiner — Ishrat Jamali
(74) Attorney, Agent, or Firm — Fish & Richardson P.C.

(57) ABSTRACT

A switching power supply device includes a switching control circuit that generates a switching control signal such that a desired output voltage is generated from an input voltage, a drive circuit that turns on/off an output transistor in accordance with the switching control signal, and an on-pulse stop circuit that generates a pulse stop signal such that the number of ON pulses of the switching control signal is reduced in a state where a load is heavier than a first threshold but is lighter than a second threshold.

16 Claims, 11 Drawing Sheets

SWITCHING POWER SUPPLY DEVICE

CROSS-REFERENCE TO RELATED APPLICATIONS

This application is based on the following Japanese Patent Applications, and the contents of which are hereby incorporated by reference:

(1) Japanese Patent Application No. 2014-180426 (filed on Sep. 4, 2014)

BACKGROUND OF THE INVENTION

1. Field of the Invention

The present invention relates to a switching power supply device.

2. Description of Related Art

Some of the conventional switching power supply devices are provided with a power saving mode (a so-called burst mode) in which the switching driving of an output transistor is suspended under a null or extremely light load.

An example of the conventional arts related to the above is disclosed in Japanese Patent Application Publication No. 2002-315333.

However, with such conventional switching devices, there has been a demand for further reduction of the power consumption also when the load is light but not light enough to cause a mode shift to the burst mode.

SUMMARY OF THE INVENTION

In view of the above-described problem found by the inventor of the present application, an object of the present invention is to provide a switching power supply device capable of reducing power consumption under a light load.

According to an aspect of the present invention disclosed herein, a switching power supply device includes a switching control circuit that generate a switching control signal such that a desired output voltage is generated from an input voltage, a drive circuit that turns on/off an output transistor in accordance with the switching control signal, and an on-pulse stop circuit that generates a pulse stop signal such that the number of ON pulses is reduced (ON pulses of the switching control signal are thinned out) under a load that is heavier than a first threshold but lighter than a second threshold.

Other features, components, steps, advantages, and characteristics of the present invention will be further clarified by the following detailed descriptions of best modes and accompanying drawings related thereto.

DETAILED DESCRIPTION OF PREFERRED EMBODIMENTS

Switching Power Supply Device

Figure 1:
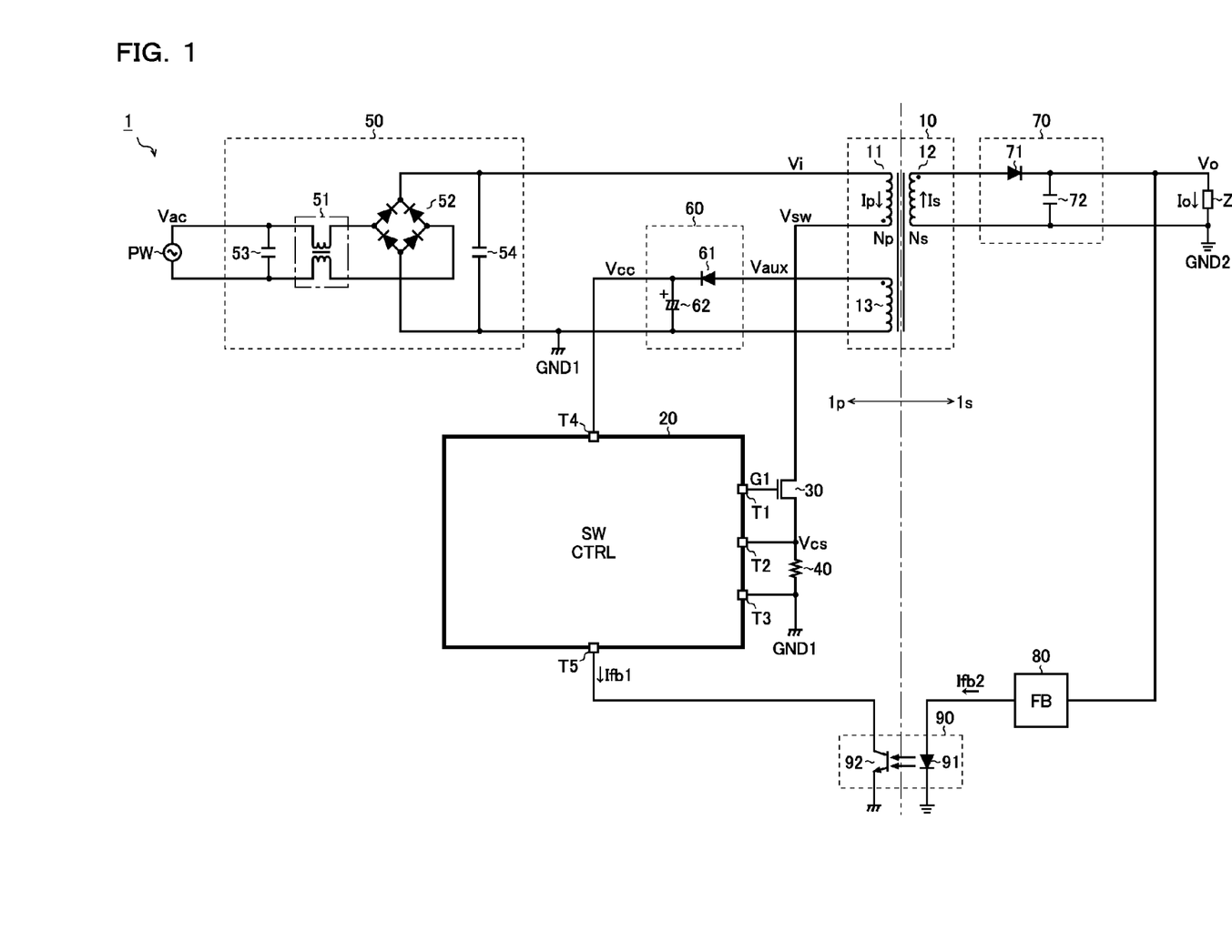
FIG. 1 is a diagram showing an overall configuration of a switching power supply device.

FIG. 1 is a block diagram showing an overall configuration of a switching power supply device. A switching power supply device 1 of the present configuration example is an insulating AC/DC converter that electrically insulates a primary circuit system 1p (GND1 system) and a secondary circuit system 1s (GND2 system) from each other, meanwhile converting an alternating-current (AC) voltage Vac supplied from a commercial AC power supply PW into a direct-current (DC) output voltage Vo, which is supplied to a load Z. The switching power supply device 1 includes a transformer 10, a semiconductor device 20, an output transistor 30, a sense resistor 40, an AC/DC conversion portion 50, a power supply voltage generation portion 60, a rectifying and smoothing portion 70, an output feedback portion 80, and a photo coupler 90.

The transformer 10 includes a primary coil 11 (number of turns Np) and a secondary coil 12 (number of turns Ns) that electrically insulate the primary circuit system 1p and the secondary circuit system 1s from each other, the primary coil 11 and the secondary coil 12 being magnetically coupled to each other by having opposite polarities. A first end of the primary coil 11 is connected to an application end of an input voltage Vi. A second end of the primary coil 11 is connected to a ground end GND1 of the primary circuit system 1p via the output transistor 30 and the sense resistor 40. A first end of the secondary coil 12 is connected to an application end of an output voltage Vo (a power supply input end of the load Z) via the rectifying and smoothing portion 70. A second end of the secondary coil 12 is connected to a ground end GND2 of the secondary circuit system 1s. The numbers of turns Np and Ns may be arbitrarily adjusted such that a desired voltage can be obtained as the output voltage Vo. For example, the larger the number of turns Np is, or the smaller the number of turns Ns is, the lower the output voltage Vo falls, while the smaller the number of turns Np is, or the larger the number of turns Ns is, the higher the output voltage Vo rises. Furthermore, the transformer 10 includes an auxiliary coil 13 in addition to the primary coil 11 and the secondary coil 12. The auxiliary coil 13 is used when generating a power supply voltage Vcc of the semiconductor device 20.

The semiconductor device 20 is a switching control IC that drives the transformer 10, and generates a gate signal G1 of the output transistor 30 in accordance with a feedback current Ifb and a sense voltage Vcs. Moreover, the semiconductor device 20 has external terminals T1 to T5 as means for achieving external electric connections. Illustrated in FIG. 1 are five terminals, namely, an external terminal T1 (OUT pin) to which a gate of the output transistor 30 is connected, an external terminal T2 (CS pin) to which the sense voltage Vcs is applied, an external terminal T3 (GND pin) connected to the ground end GND1, an external terminal T4 (VCC) to which the power supply voltage Vcc is applied, and an external terminal T5 (FB pin) through which the feedback current Ifb is made to flow, but more external terminals may be provided.

The output transistor 30 is a switch element that turns on/off a primary current Ip that flows through the primary coil 11 by connecting/disconnecting, in accordance with the gate signal G1, a current path leading from the application end of the input voltage Vi to the ground end GND1 via the primary coil 11. Used as the output transistor 30 in the present configuration example is a high-voltage N-channel type metal oxide semiconductor (MOS) field-effect transistor. Connection relationship of the output transistor 30 is as follows: a drain of the output transistor 30 is connected to the second end of the primary coil 11; a source of the output transistor 30 is connected to the ground end GND1 via the sense resistor 40; and a gate of the output transistor 30 is connected to the external terminal T1 (an application end of the gate signal G1). The output transistor 30 is turned on when the gate signal G1 is at a high level, and the output transistor 30 is turned off when the gate signal G1 is at a low level.

The sense resistor 40 is connected between the source of the output transistor 30 and the ground end GND1, and generates the sense voltage Vcs in accordance with the primary current Ip.

The AC/DC conversion portion 50 includes a common mode filter 51, a diode bridge 52, and capacitors 53 and 54, and generates the input voltage Vin, which is a DC (pulsating) voltage, from the AC voltage Vac. The common mode filter 51 removes common mode noise from the AC voltage Vac. The diode bridge 52 generates the input voltage Vin by performing full wave rectification on the AC voltage Vac. The capacitor 53 removes high harmonic noise from the AC voltage Vac. The capacitor 54 smooths the input voltage Vin. Here, the AC/DC conversion portion 50 may include a protective element such as a fuse.

The power supply voltage generation portion 60 is a rectifying and smoothing circuit including a diode 61 and a capacitor 62. The power supply voltage generation portion 60 generates the power supply voltage Vcc of the semiconductor device 20 from an induction voltage Vaux of the auxiliary coil 13, and applies the generated power supply voltage Vcc to the external terminal T4 of the semiconductor device 20. A turn ratio between the primary coil 11 and the auxiliary coil 13 may be set appropriately by considering what level of power supply voltage Vcc is required for the semiconductor device 20 to operate.

The rectifying and smoothing portion 70 includes a rectifying diode 71 and a smoothing capacitor 72, and generates the output voltage Vo by rectifying and smoothing the induction voltage generated in the secondary coil 12. Connection relationship of the rectifying and smoothing portion 70 is as follows: an anode of the diode 71 is connected to the first end of the secondary coil 12; a cathode of the diode 71 and a first end of the capacitor 72 are both connected to the application end of the output voltage Vo; and a second end of the capacitor 72 is connected to the ground end GND2.

The output feedback portion 80 generates a secondary-side feedback current Ifb2 in accordance with the output voltage Vo, and feeds the generated feedback current Ifb2 to the photo coupler 90. The feedback current Ifb2 is generated such that the more the output voltage Vo is higher than a target value, the larger the feedback current Ifb2 is, and the more the output voltage Vo is lower than the target value, the smaller the feedback current Ifb2 is. From another point of view, the feedback current Ifb2 is larger as the load Z is lighter (that is, as the output current To consumed by the load Z is smaller), and the feedback current Ifb2 is smaller as the load Z is heavier (that is, as the output current To consumed by the load Z is larger). In this manner, the feedback current Ifb2 varies in accordance with the output voltage Vo (or the output current To (load)).

The photo coupler 90 includes a light emitting diode 91 provided in the secondary circuit system 1s, and a photo transistor 92 provided in the primary circuit system 1p. The photo coupler 90 delivers a signal from the secondary circuit system 1s to the primary circuit system 1p, while electrically insulating the primary circuit system 1p and the secondary circuit system 1s from each other. More specifically, a primary-side feedback current Ifb1 is generated by detecting, by means of the photo transistor 92, light emitted from the light emitting diode 91 at a brightness in accordance with the feedback current Ifb2. Thus, the feedback current Ifb1 varies in the same manner as the feedback current Ifb2.

<Switching Operation>

When the gate signal G1 rises up to a high level, the output transistor 30 is turned on. In the ON period of the output transistor 30, the primary current Ip flows from the application end of the input voltage Vi toward the ground end GND1 via the primary coil 11, the output transistor 30, and the sense resistor 40, as a result of which electric energy is stored in the primary coil 11.

Thereafter, when the gate signal G1 is made to fall to a low level, the output transistor 30 is turned off. In the OFF period of the output transistor 30, an induction voltage is generated in the secondary coil 12, which is magnetically coupled to the primary coil 11, and the secondary current Is flows from the secondary coil 12 toward the ground end GND2 via the diode 71. Meanwhile, the output voltage Vo resulting from half-wave rectification of the induction voltage generated in the secondary coil 12 is supplied to the load Z.

Thereafter, the above-described switching operation continues to be repeated by turning on the gate signal G1 at a predetermined switching frequency fsw.

Thus, according to the switching power supply device 1 of the present configuration example, it is possible to generate the output voltage Vo from the AC voltage Vac and supply the output voltage Vo to the load Z, while electrically insulating the primary circuit system 1p and the secondary circuit system 1s from each other. Incidentally, in comparison with the forward system that needs a rectifying inductor, the flyback system adopted in the switching power supply device 1 of the present configuration example needs a smaller number of components, and thus is more advantageous in terms also of cost reduction.

<Semiconductor Device (Switching Control IC)>

Figure 2:
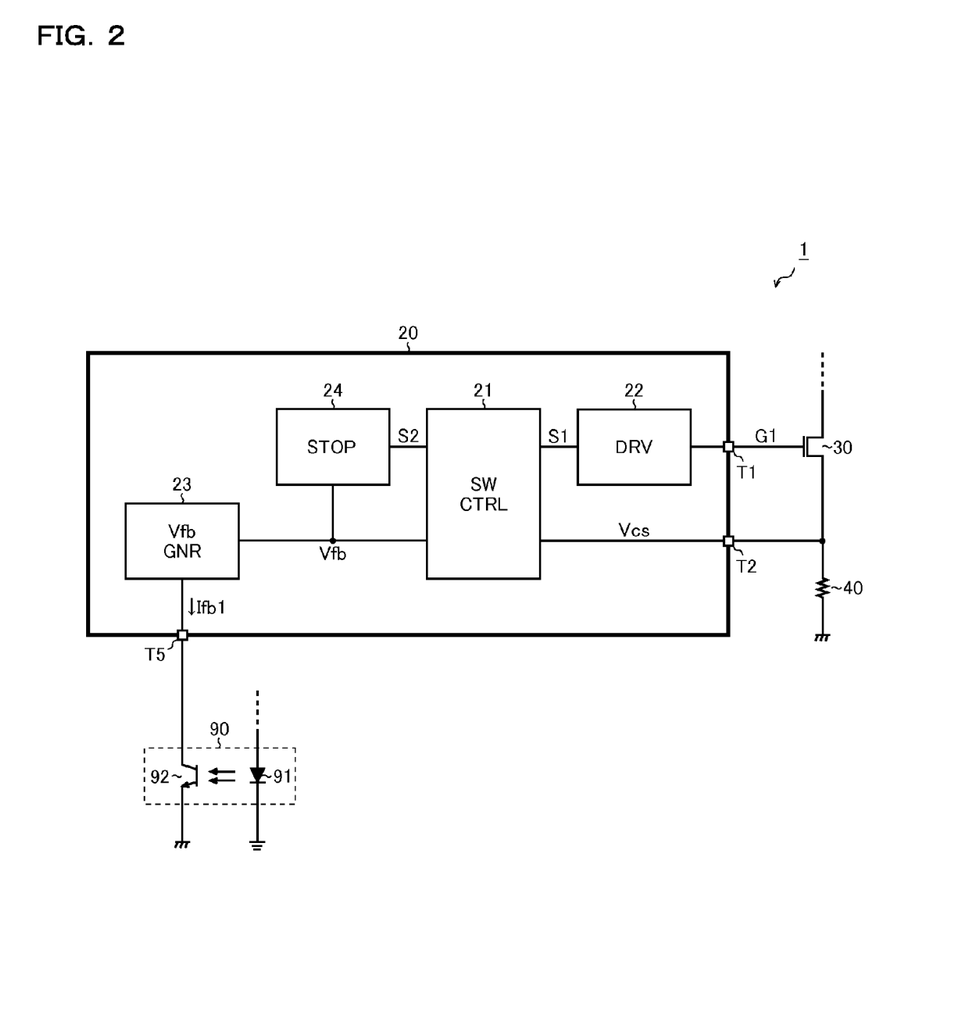
FIG. 2 is a block diagram showing a configuration example of a semiconductor device 20.

FIG. 2 is a block diagram showing a configuration example of the semiconductor device 20. The semiconductor device 20 of the present configuration example includes integrated therein a switching control circuit 21, a drive circuit 22, a feedback voltage generation circuit 23, and an on-pulse stop circuit 24. Although not clearly shown in FIG. 2, the semiconductor device 20 also includes integrated therein a power supply circuit, an anti-malfunction protection circuit, etc.

The switching control circuit 21 generates a switching control signal S1 such that a desired voltage is generated as the output voltage Vo from the input voltage Vi in accordance with the feedback voltage Vfb and the sense voltage Vcs. Moreover, the switching control circuit 21 is provided also with a function to suspend ON pulses of the switching control signal S1 in accordance with a pulse stop signal S2. The configuration and the operation of the switching control circuit 21 will be described later.

The drive circuit 22 turns on/off the output transistor 30 by generating the gate signal G1 in accordance with the switching control signal S1. The gate signal G1 takes a high level when the switching control signal S1 is at a high level, and the gate signal G1 takes a low level when the switching control signal S1 is at a low level.

The feedback voltage generation circuit 23 generates the feedback voltage Vfb in accordance with the feedback current Ifb1. The configuration and the operation of the feedback voltage generation circuit 23 will be described later.

The on-pulse stop circuit 24 monitors the feedback voltage Vfb2, and generates the pulse stop signal S2 in accordance with a load state. The pulse stop signal S2 takes a low level (which corresponds to a logic level taken at a time of pulse suspension) to suspend the ON pulses of the switching control signal S1, and when the ON pulses of the switching control signal S1 are not to be suspended, the pulse stop signal S2 takes a high level (which corresponds to a logic level taken at a time of cancellation of pulse suspension). The configuration and the operation of the on-pulse stop circuit 24 will be described later.

Figure 3:
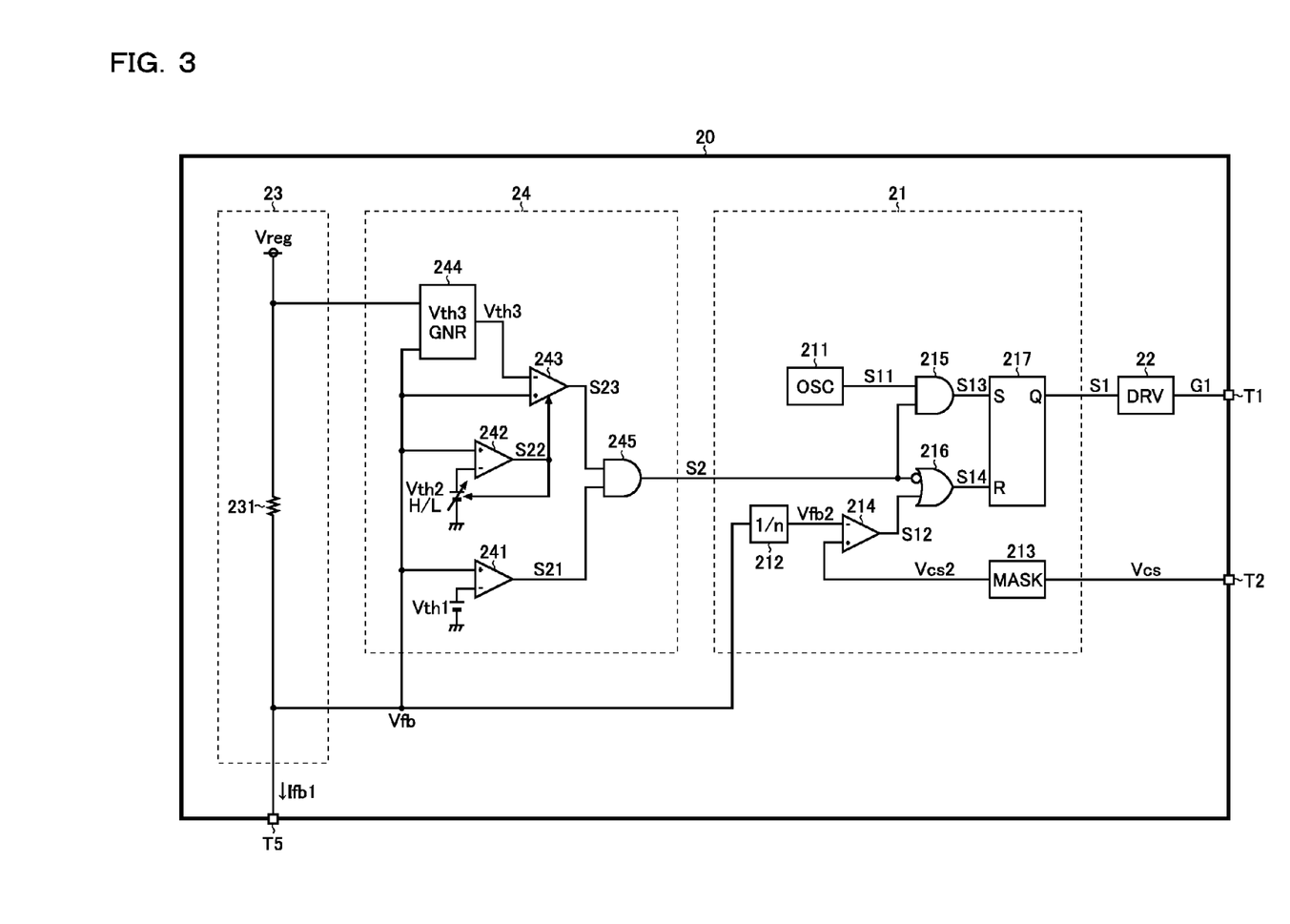
FIG. 3 is a circuit diagram showing a configuration example of circuit blocks 21, 23, and 24.

FIG. 3 is a circuit diagram showing a configuration example of each of the switching control circuit 21, the feedback voltage generation circuit 23, and the on-pulse stop circuit 24.

The switching control circuit 21 includes an oscillation portion 211, a voltage division portion 212, a mask processing portion 213, a comparator 214, an AND gate 215, an OR gate 216, and an RS flip-flop 217.

The oscillation portion 211 (which corresponds to an on-signal generation portion) generates pulses in the ON signal S11 at a predetermined switching frequency fsw.

The voltage division portion 212 divides the feedback voltage Vfb at a predetermined division ratio "1/n" (for example, "¼"), and thereby generates an internal feedback voltage Vfb2 (=Vfb/n).

The mask processing portion 213 generates an internal sense voltage Vcs2 by performing predetermined mask processing on the sense voltage Vcs. To be more specific, the mask processing portion 213 fixes the internal sense voltage Vcs2 to zero for a predetermined mask period after the output transistor 30 is turned on. This makes it possible to eliminate effects of ringing noise of the sense voltage Vcs caused when the output transistor 30 is ON, and thus to achieve a more stable switching control operation.

The comparator 214 (which corresponds to an off-signal generation portion) generates an OFF signal S12 in accordance with an output feedback control, by comparing the internal feedback voltage Vfb2 input to an inverting input end (−) thereof with the internal sense voltage Vcs input to a noninverting input end (+) thereof. The OFF signal S12 takes a high level when the internal feedback voltage Vfb2 is lower than the internal sense voltage Vcs2, and the OFF signal S12 takes a low level when the internal feedback voltage Vfb2 is higher than the internal sense voltage Vcs2.

The AND gate 215 generates an AND signal S13 of the ON signal S11 and the pulse stop signal S2. The AND signal S13 takes a low level when at least one of the ON signal S11 and the pulse stop signal S2 is at a low level, and the AND signal S13 takes a high level when the ON signal S11 and the pulse stop signal S2 are both at a high level. That is, when the pulse stop signal S2 is at a high level, the ON signal S11 is output as the AND signal S13 as it is without receiving any further processing, whereas when the pulse stop signal S2 is at a low level, the AND signal S13 is fixed to a low level regardless of the logic level of the ON signal S11. Thus, the AND gate 215 functions as a logic gate portion that masks the ON signal S11 in accordance with the pulse stop signal S2.

The OR gate 216 generates an OR signal S14 of the OFF signal S12 input to a first input end thereof and the pulse stop signal S2 inverted and input to a second input end thereof. The OR signal S14 takes a high level when the OFF signal S12 is at a high level or the pulse stop signal S2 is at a low level, and the OR signal S14 takes a low level when the OFF signal S12 is at a low level and the pulse stop signal S2 is at a high level.

The RS flip-flop 217 generates the switching control signal S1 in accordance with the AND signal S13 (which is equivalent to the ON signal S11 at a time of cancellation of pulse suspension (S2=H)) that is input to a set end (S) of the RS flip-flop 217 and the OR signal S14 (which is equivalent to the OFF signal S12 at a time of cancellation of pulse suspension (S2=H)) that is input to a reset end (R) of the RS flip-flop 217. To be more specific, the RS flip-flop 217 sets the switching control signal S1 to a high level at a rising edge of the AND signal S13, whereas the RS flip-flop 217 resets the switching control signal S1 to a low level at a rising edge of the OR signal S14.

The feedback voltage generation circuit 23 has a very simple configuration constituted only by a resistor 231 (resistance value: R231) that is connected between an application end of a constant voltage Vreg and the external terminal T5. The feedback current Ifb1 flows through the resistor 231, and this causes a voltage drop in accordance with the feedback current Ifb1 (=Ifb1×R231) between two ends of the resistor 231. That is, the feedback voltage Vfb (=Vreg−Ifb1×R231) obtained at a low voltage end (the external terminal T5) of the resistor 231 is lower as the feedback current Ifb1 is larger, and is higher as the feedback current Ifb1 is smaller. Here, superposed on the feedback voltage Vfb is an oscillation component (an output ripple) with a cutoff frequency fc, which an output feedback loop has.

Now a specific description will be given of an output feedback control performed by using the switching control circuit 21 and the feedback voltage generation circuit 23 configured as described above. The more the output voltage Vo is higher than a target value, the more the feedback current Ifb1 increases, and thus the more the feedback voltage Vfb falls. As a result, the internal feedback voltage Vfb2 and the internal sense voltage Vcs2 intersect each other at an earlier timing and the OFF signal S12 rises up at an earlier timing, and this shortens the ON period of the output transistor 30, and thus lowers the output voltage Vo.

Conversely, the more the output voltage Vo is lower than the target value, the more the feedback current Ifb1 decreases, and thus the more the feedback voltage Vfb rises. As a result, the internal feedback voltage Vfb2 and the internal sense voltage Vcs2 intersect each other at a delayed timing and the OFF signal S12 rises up at a delayed timing, and this lengthens the ON period of the output transistor 30, and thus raises the output voltage Vo.

Moreover, the larger the primary current Ip flowing in the output transistor 30 is, the more the sense voltage Vcs rises. As a result, the internal feedback voltage Vfb2 and the internal sense voltage Vcs2 intersect each other at an earlier timing and the OFF signal S12 rises up at an earlier timing, and thus the ON period of the output transistor 30 is shortened and the increase of the primary current Ip is reduced.

Conversely, the larger the primary current Ip flowing in the output transistor 30 is, the more the sense voltage Vcs falls. As a result, the internal feedback voltage Vfb2 and the internal sense voltage Vcs2 intersect each other at a delayed timing and the OFF signal S12 rises at a delayed timing, and thus the ON period of the output transistor 30 is lengthened and the increase of the primary current Ip is promoted.

Thus, in the switching power supply device 1 of the present configuration example, the voltage feedback control and the current feedback control are both carried out as the output feedback control.

The on-pulse stop circuit 24 includes three comparators 241 to 243, a threshold voltage generation portion 244, and an AND gate 245.

The comparator 241 generates a comparison signal S21 by comparing the feedback voltage Vfb input to a noninverting input end (+) thereof with a threshold voltage Vth1 (0.4 V, for example) input to an inverting input end (−) thereof. The comparison signal S21 takes a high level (the logic level taken at a time of cancellation of the burst mode) when the feedback voltage Vfb is higher than the threshold voltage Vth1, and the comparison signal S21 takes a low level (the logic level taken in the burst mode) when the feedback voltage Vfb is lower than the threshold voltage Vth1.

The comparator 242 generates a comparison signal S22 by comparing the feedback voltage Vfb input to a noninverting input end (+) thereof with a threshold voltage Vth2 input to an inverting input end (−) thereof. Note that the threshold voltage Vth2 has a hysteresis characteristic, and when the comparison signal S22 is at a low level, the threshold voltage Vth2 is switched to an upper threshold voltage Vth2H (1.25 V, for example), and when the comparison signal S22 is at a high level, the threshold voltage Vth2 is switched to a lower threshold voltage Vth2L (1.05 V, for example). Thus, the comparison signal S22 at a low level rises up to a high level (the logic level taken in a normal mode) when the feedback voltage Vfb has become higher than the threshold voltage Vth2H. On the other hand, the comparison signal S22 at a high level falls when the feedback voltage Vfb has become lower than the threshold voltage Vth2L.

The comparator 243 generates a comparison signal S23 by comparing the feedback voltage Vfb input to a noninverting input end (+) thereof with a threshold voltage Vth3 input to an inverting input end (−) thereof. The comparison signal S23 takes a high level (the logic level taken at a time of cancellation of pulse suspension) when the feedback voltage Vfb is higher than the threshold voltage Vth3, and the comparison signal S23 takes a low level (the logic level taken at a time of pulse suspension) when the feedback voltage Vfb is lower than the threshold voltage Vth3. Moreover, enabling of the comparator 243 is controlled in accordance with the comparison signal S22. To be more specific, when the comparison signal S22 is at a low level, the comparator 243 is enabled, and the above-described operation of generating the comparison signal S23 is performed. On the other hand, when the comparison signal S22 is at a high level, the comparator 243 is disabled. At this time, the comparison signal S23 is fixed to a high level regardless of the result of comparison between the feedback voltage Vfb and the threshold voltage Vth3. By controlling the enabling of the comparator 243 in this way, it is possible to stop the operation of generating the comparison signal S23 in the normal mode, and thus to reduce power consumption by the comparator 243.

The threshold voltage generation portion 244 generates the threshold voltage Vth3 in accordance with the feedback voltage Vfb (in the present configuration example, a voltage between the two ends of the resistor 231). The configuration and the operation of the threshold voltage generation portion 244 will be described later in detail.

The AND gate 245 generates the pulse stop signal S2 by performing an AND operation of the comparison signal S21 and the comparison signal S23. The pulse stop signal S2 takes a low level when at least one of the comparison signals S21 and S23 is at a low level, and takes a high level when the comparison signals S21 and S23 are both at a high level.

<Operational Mode Shift Control>

Figure 4:
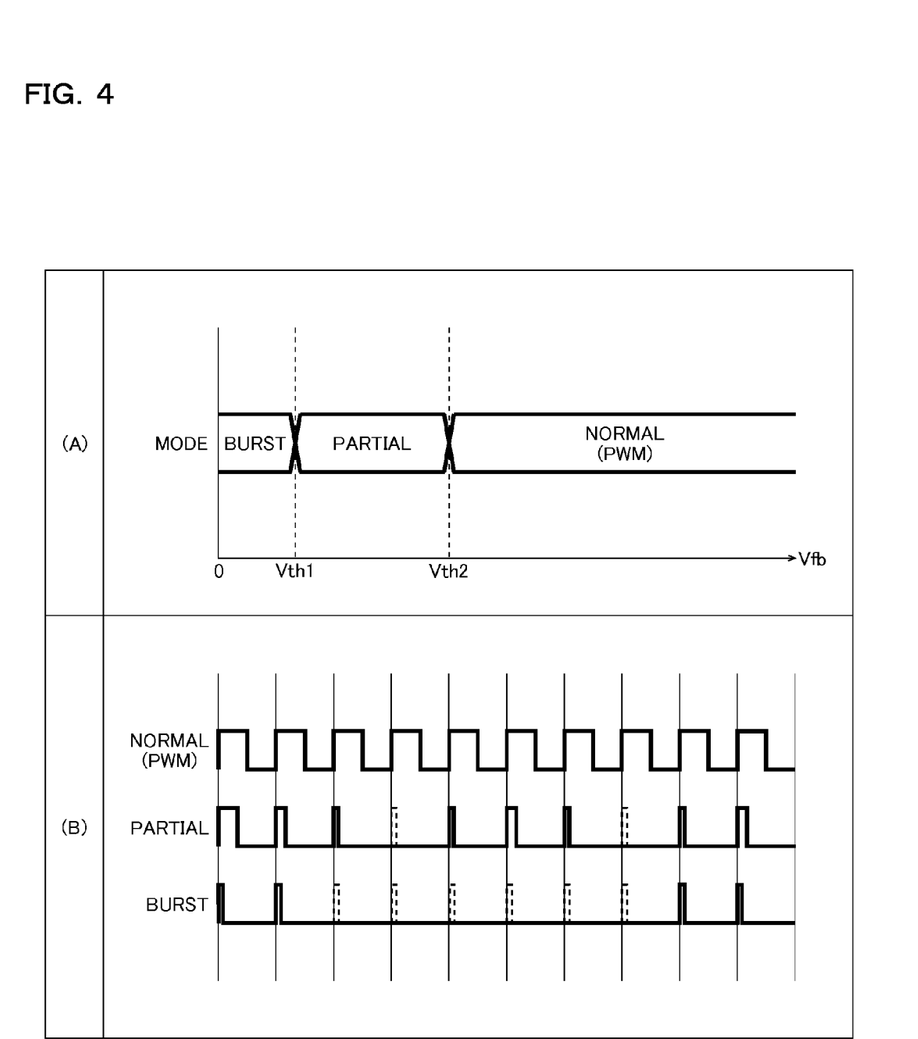
FIG. 4 is a correlation diagram between a feedback voltage Vfb and operational modes.

FIG. 4 is a diagram for illustrating operational mode shift control performed by the on-pulse stop circuit 24. What is illustrated in box (A) of FIG. 4 is a correlation between the feedback voltage Vfb and operational modes, and in box (B) of FIG. 4, pulse wave forms of the switching control signal S1 in different operational modes are schematically illustrated.

The comparison signal S21 takes a low level when the feedback voltage Vfb is lower than the threshold voltage Vth1, and thus the pulse stop signal S2 takes a low level regardless of the logic level of the comparison signal S23. Thus, the ON signal S11 continues to be masked by the pulse stop signal S2 until the feedback voltage Vfb becomes higher than the threshold voltage Vth1.

That is, the on-pulse stop circuit 24 fixes the pulse stop signal S2 to a low level such that the ON pulses of the switching control signal S1 are suspended for a plurality of cycles in a state where the feedback voltage Vfb is lower than the threshold voltage Vth1 (that is, in a null load or extremely light load state where the load Z is lighter than a first threshold). Herein, such an operational mode will be referred to as a "burst mode (BURST)". In the burst mode, the output transistor 30 is not turned on/off unnecessarily, and thus it is possible to enhance efficiency under a null load or under an extremely light load.

On the other hand, when the feedback voltage Vfb is higher than the threshold voltage Vth2, the comparison signals S21 and S22 both take a high level. Moreover, since the comparator 243 is disabled when the comparison signal S22 is at a high level, the comparison signal S23 is also fixed to a high level. As a result, the pulse stop signal S2 takes a high level, and thus a state is brought about where the ON signal S11 is not masked by the pulse stop signal S2. Thus, in the switching control signal S1, ON pulses are generated at the predetermined switching frequency fsw.

In other words, in a state where the feedback voltage Vfb is higher than the threshold voltage Vth2 (that is, in a normal load or heavy load state where the load Z is heavier than a second threshold), the on-pulse stop circuit 24 fixes the pulse stop signal S2 to a high level such that the number of ON pulses of the switching control signal S1 is not reduced. Herein, such an operational mode is referred to as a "normal mode (NORMAL)". The output transistor 30 is continuously turned on/off in the normal mode, and this makes it possible to keep the output voltage Vo to a desired level.

The shift between the above-described burst and normal modes has conventionally been done directly between the two modes, but in the switching power supply device 1 of the present configuration example, a "forced intermittent mode (PARTIAL)" is added between the burst mode and the normal mode.

To be specific, when the feedback voltage Vfb is higher than the threshold voltage Vth1 but lower than the threshold voltage Vth2, the comparison signal S22 takes a low level, and thus, the comparator 243 is enabled. Thus, a state is brought about where the comparison signal S23 is alternately switched between high and low levels in accordance with the result of comparison between the feedback voltage Vfb and the threshold voltage Vth3. Moreover, the comparison signal S21 takes a high level, and thus a state is brought about where the comparison signal S23 is output as the pulse stop signal S2 as it is without receiving any further processing.

That is, the on-pulse stop circuit 24 generates the pulse stop signal S2 such that the number of ON pulses of the switching control signal S1 is reduced in a state where the feedback voltage Vfb is higher than the threshold voltage Vth1 but lower than the threshold voltage Vth2 (that is, in a state where the load Z is heavier than the first threshold but lighter than the second threshold).

The addition of the forced intermittent mode as described above makes it possible to achieve further reduction of power consumption in a light-load state where the load is not heavy enough to require an immediate shift to the burst mode.

Here, the above-mentioned hysteresis characteristic of the threshold voltage Vth2 helps prevent unduly sensitive shifts between the normal mode and the forced intermittent mode.

<Forced Intermittent Mode>

Figure 5:
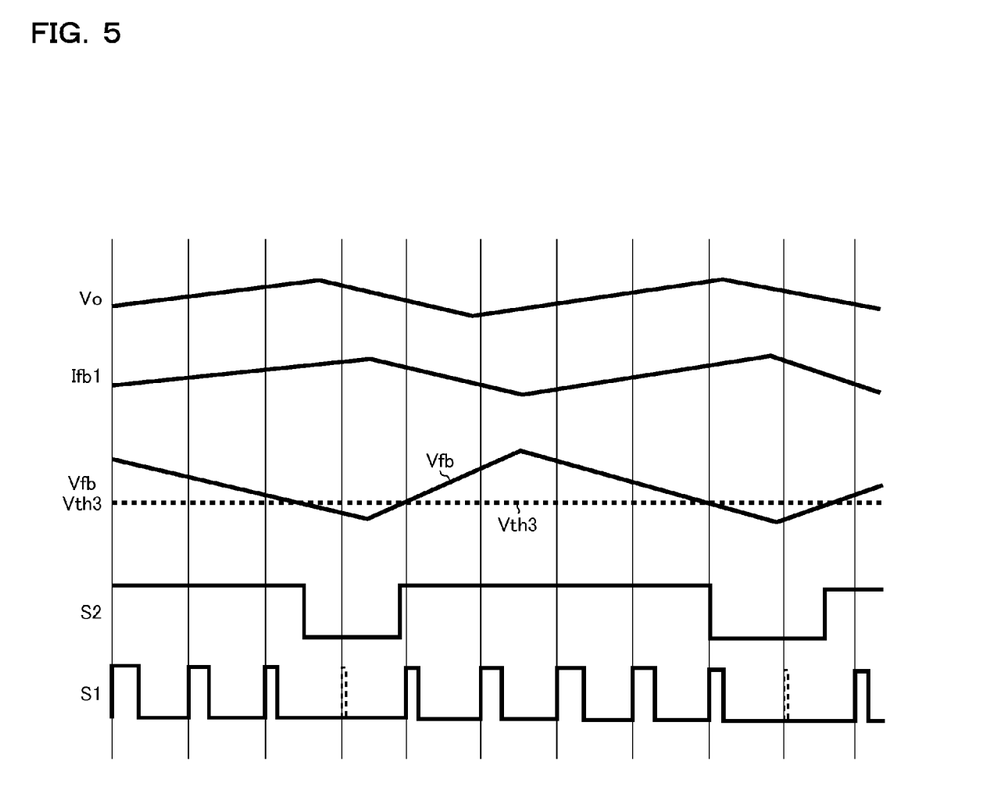
FIG. 5 is a time chart showing an operation example of a forced intermittent mode.

FIG. 5 is a time chart showing an operation example in the forced intermittent mode, illustrating, in order from the top, the output voltage Vo, the feedback current Ifb1, the feedback voltage Vfb (solid lines), the threshold voltage Vth3 (a broken line), the pulse stop signal S2, and the switching control signal S1.

As shown in FIG. 5, superposed on the feedback voltage Vfb is an oscillation component (an output ripple) with a cutoff frequency fc, which the output feedback loop has. On the other hand, the threshold voltage Vth3 is generated to have a voltage level higher than a minimum voltage level of the feedback voltage Vfb but lower than a maximum voltage level of the feedback voltage Vfb (detailed description will be given later), and thus its above-below relationship with respect to the feedback voltage Vfb which oscillates is periodically reversed. Accordingly, the logic level of the pulse stop signal S2 is periodically switched between high and low levels. As a result, during a period in which the pulse stop signal S2 is at a low level, the number of ON pulses of the switching control signal S1 is reduced.

<Threshold Voltage Generation Portion>

Figure 6:
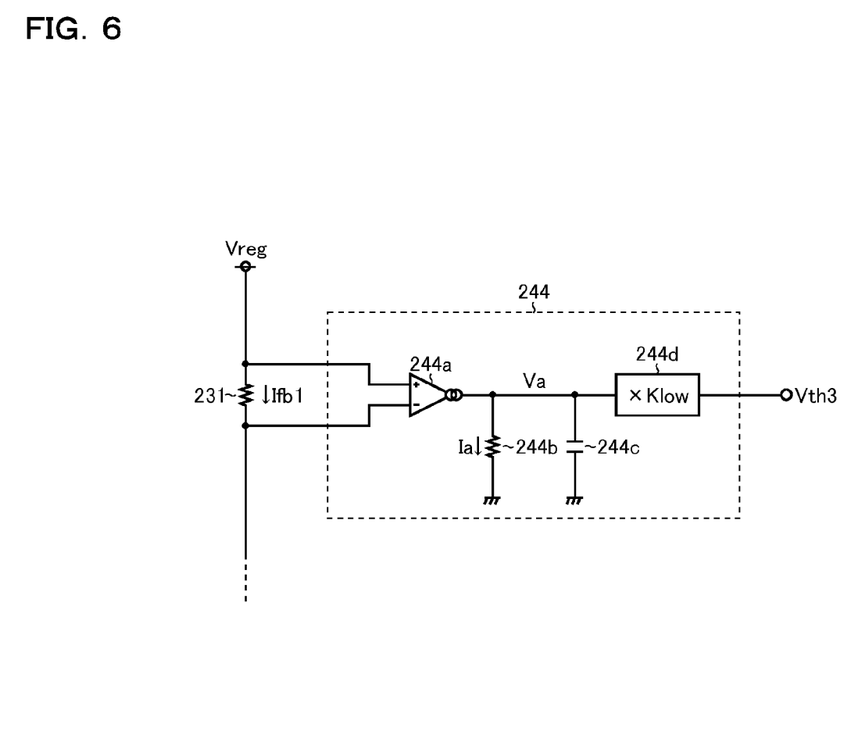
FIG. 6 is a circuit diagram showing a configuration example of a threshold voltage generation portion 244.

FIG. 6 is a circuit diagram showing a configuration example of the threshold voltage generation portion 244. The threshold voltage generation portion 244 of the present configuration example includes a current output amplifier 244a, a resistor 244b, a capacitor 244c, and a coefficient multiplication portion 244d.

On receiving an input of a voltage between two ends of the resistor 231 (=Ifb1×R231), the current output amplifier 244a generates a current Ia (=α×Ifb1, where a is a proportional constant) which is proportional to the feedback current Ifb1. That is, the larger the feedback current Ifb1 is, the larger the current Ia becomes, and the smaller the feedback current Ifb1 is, the smaller the current Ia becomes.

The resistor 244b (resistance: R244b), which is connected between an output end of the current output amplifier 244a and a ground end, generates a voltage Va (=Ia× R244b=Kgain×Ifb1, where Kgain=α×R244b) by performing current/voltage conversion on the current Ia.

The capacitor 244c performs smoothing processing (time averaging processing) on the voltage Va. Here, an averaging circuit may be provided instead of the capacitor 244c.

The voltage Va generated by using the current output amplifier 244a, the resistor 244b, and the capacitor 244c, which have been described above, is equivalent to a time average value of the feedback voltage Vfb.

The coefficient multiplication portion 244d generates the threshold voltage Vth3 by multiplying the voltage Va by a coefficient Klow that is larger than zero but smaller than one (Klow=0.2, for example). The threshold voltage Vth3 generated in this way has a voltage level that is higher than the minimum level but lower than the maximum level of the feedback voltage Vfb, and thus its above-below relationship with respect to the feedback voltage Vfb which oscillates is periodically reversed.

<Coefficient Multiplication Portion>

Figure 7:
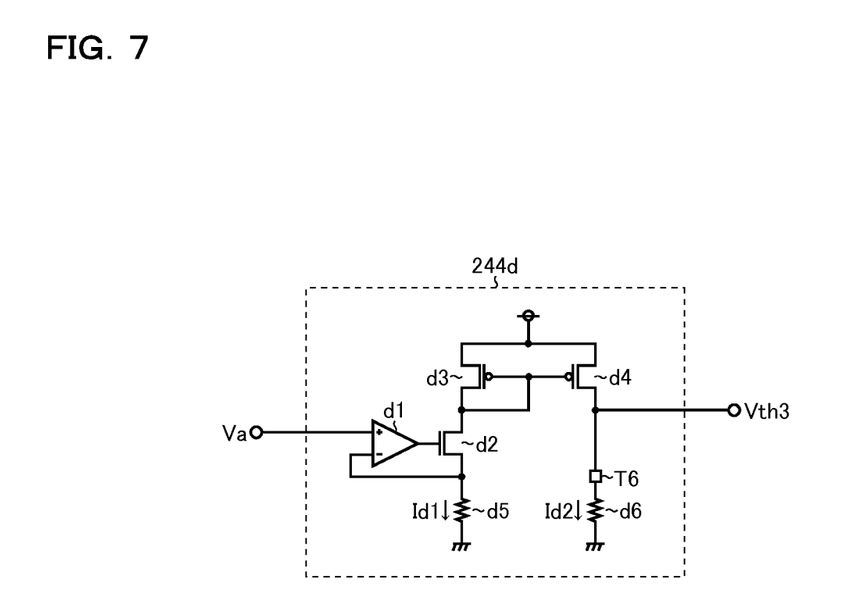
FIG. 7 is a circuit diagram showing a configuration example of a coefficient multiplication portion 244d.

FIG. 7 is a circuit diagram showing a configuration example of the coefficient multiplication portion 244d. The coefficient multiplication portion 244d of the present configuration example includes an operational amplifier d1, an N-channel type MOS field-effect transistor d2, P-channel type MOS field-effect transistors d3 and d4, and resistors d5 and d6 (resistances: Rd5 and Rd6, respectively).

A noninverting input end (+) of the operational amplifier d1 is connected to an application end of the voltage Va. An inverting input end (−) of the operational amplifier d1 is connected to a source of the transistor d2. An output end of the operational amplifier d1 is connected to a gate of the transistor d2. The source of the transistor d2 is connected to a ground end via the resistor d5. A drain of the transistor d2 is connected to a drain of the transistor d3. Sources of the transistors d3 and d4 are connected to a power supply end. Gates of the transistors d3 and d4 are connected to the drain of transistor d3. A drain of the transistor d4 is connected also to an external terminal T6 of the semiconductor device 20 while being connected to an output end of the threshold voltage Vth3. The resistor d6 is externally connected between the external terminal T6 and the ground end.

The operational amplifier d1 controls the gate of the transistor d2 such that a virtual short circuit occurs between the noninverting input end (+) and the inverting input end (−). As a result, a current Id1 (=Va/Rd5) in accordance with the voltage Va flows through the resistor d5. The transistors d3 and d4 form a current mirror that mirrors the current Id1 flowing through the drain of the transistor d3 at a predetermined mirror ratio β, and thereby outputs a mirror current Id2 (=β×Id1) from the drain of the transistor d4. The resistor d6 generates the threshold voltage Vth3 (=Id2×Rd6) by performing current/voltage conversion on the mirror current Id2.

That is, a coefficient Klow by which the voltage Va is to be multiplied at the coefficient multiplication portion 244d is obtained as a value determined in accordance with the resistances Rd5 and Rd6 and the mirror ratio β (=β×Rd6/Rd5). Thus, the coefficient Klow is arbitrarily adjustable by means of the resistor d6, which is an externally attached resistor. For example, when the resistance Rd6 of the resistor d6 is raised, the coefficient Klow becomes large, and conversely, when the resistance Rd6 of the resistor d6 is lowered, the coefficient Klow becomes small.

<Feedback Voltage Generation Circuit (Modified Example)>

Figure 8:
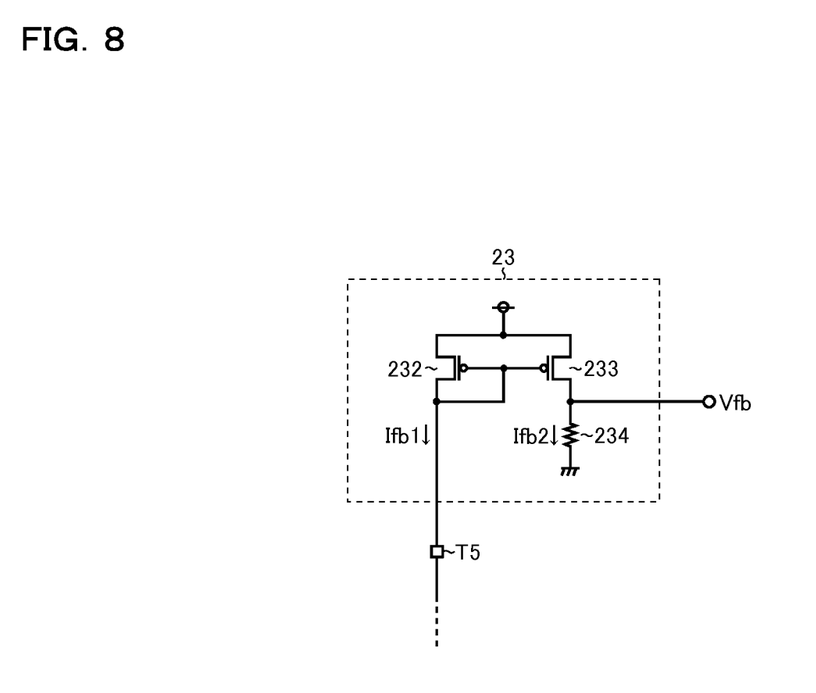
FIG. 8 is a circuit diagram showing a first modified example of a feedback voltage generation circuit 23.

FIG. 8 is a circuit diagram showing s first modified example of the feedback voltage generation circuit 23. The feedback voltage generation circuit 23 of the first modified example includes P-channel type MOS field-effect transistors 232 and 233, and a resistor 234 (resistance: R234).

Sources of the transistors 232 and 233 are both connected to the power supply end. Gates of the transistors 232 and 233 are connected to a drain of the transistor 232. The drain of the transistor 232 is connected to the external terminal T5. A drain of the transistor 233 is connected to an output end of the feedback voltage Vfb and is connected also to a ground end via the resistor 234.

The transistors 232 and 233 form a current mirror that mirrors the feedback current Ifb1 flowing through the drain of the transistor 232 at a predetermined mirror ratio γ, and thereby outputs a mirror current Ifb2 (=γ×Ifb1) from the drain of the transistor 233. The resistor 234 generates the feedback voltage Vfb (=Ifb2×R234) by performing current/voltage conversion on the mirror current Ifb2.

The feedback voltage Vfb generated in this manner becomes higher as the feedback current Ifb1 (thus the mirror current Ifb2) is larger, and conversely, the feedback voltage Vfb becomes lower as the feedback current Ifb1 is smaller. That is, in this modified example, the behavior of the feedback voltage Vfb with respect to the feedback current Ifb1 is totally opposite to that of the feedback voltage Vfb generated in the previously-described feedback voltage generation circuit 231 (see FIG. 3). Thus, to adopt the feedback voltage generation circuit 231 of the present modified example, it is necessary to appropriately change input polarities of the comparators 241 and 242 included in the on-pulse stop circuit 24 and the threshold voltages Vth1 and Vth2.

Figure 9:
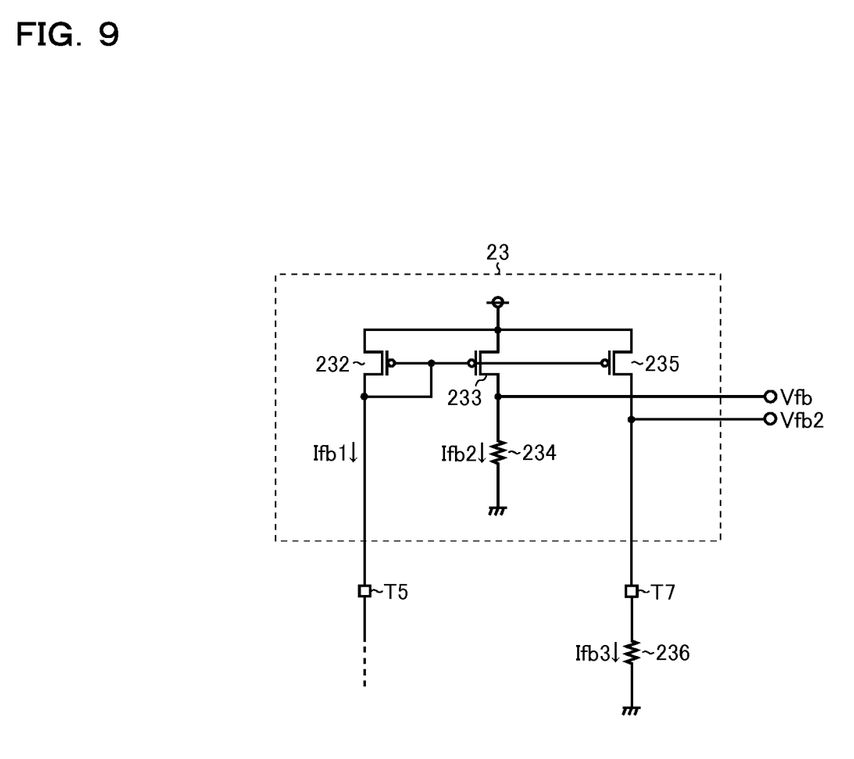
FIG. 9 is a circuit diagram showing a second modified example of the feedback voltage generation circuit 23.

FIG. 9 is a circuit diagram showing s second modified example of the feedback voltage generation circuit 23. The feedback voltage generation circuit 23 of the second modified example further includes, in addition to the components of the first modified example listed above, a P-channel type MOS field-effect transistor 235 and a resistor 236 (resistance: R236).

A source of the transistor 235 is connected to the sources of the transistors 232 and 233 and also to the power supply end. A gate of the transistor 235 is connected to the gates of the transistors 232 and 233 and the drain of the transistor 232. A drain of the transistor 235 is connected to an output end of the feedback voltage Vfb2 and an external terminal T7. The resistor 236 is externally connected between the external terminal T7 and a ground end.

The transistor 235 and the transistors 232 and 233 together form a current mirror that mirrors the feedback current Ifb1 flowing through the drain of the transistor 232 at a predetermined mirror ratio δ, and thereby outputs a mirror current Ifb3 (=δ×Ifb1) from the drain of the transistor 235. The resistor 236 generates the feedback voltage Vfb2 (=Ifb3×R236) by performing current/voltage conversion on the mirror current Ifb3.

That is, in the feedback voltage generation portion 23 of the second modified example, the two feedback voltages Vfb and Vfb2 are generated from the feedback current Ifb1. Here, the feedback voltage Vfb is fed to the comparators 241 and 242 of the on-pulse stop circuit 24, to be used to control the shifting between the operational modes. On the other hand, the feedback voltage Vfb2 is fed to the threshold voltage generation portion 244 of the on-pulse stop circuit 24, to be used to control the generation of the threshold voltage Vth3.

This configuration makes it possible to individually generate each of the feedback voltages Vfb and Vfb2 which are respectively suitable for controlling the shifting between the operational modes and for controlling the generation of the threshold voltage Vth3.

In particular, the feedback voltage Vfb2 used for controlling the generation of the threshold voltage Vth3 is arbitrarily adjustable by means of the resistor 236, which is an externally attached resistor. For example, the feedback voltage Vfb2 becomes high when the resistance R236 of the resistor 236 is raised, and conversely, the feedback voltage Vfb2 becomes low when the resistance 8236 of the resistor 236 is lowered.

<Uses>

A description will now be given of uses of the switching power supply device 1. The switching power supply device 1 is suitably used as a power supply block of an AC adapter or of an electronic apparatus.

Figure 10:
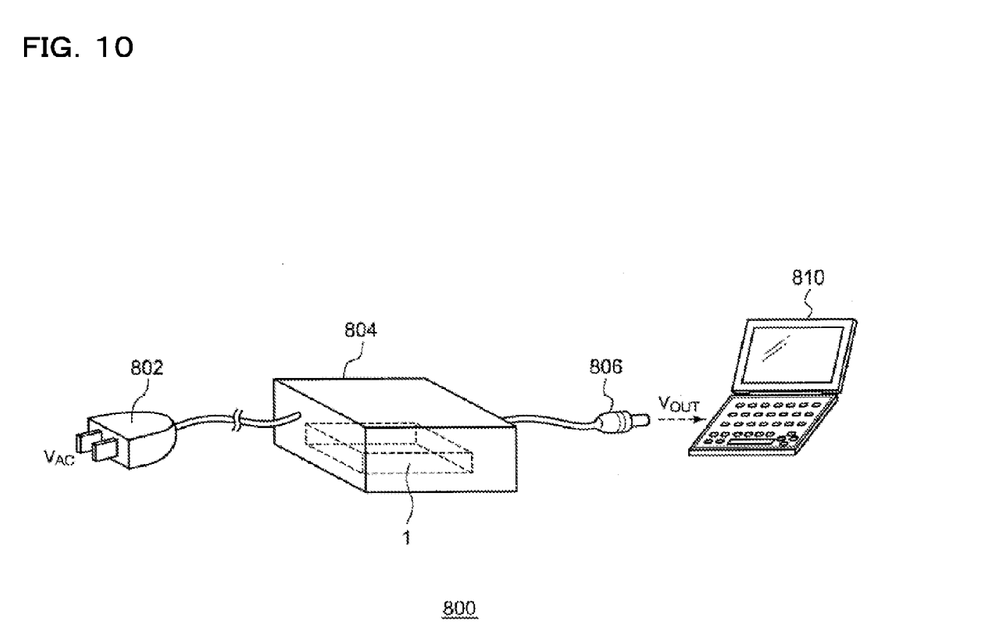
FIG. 10 is a diagram showing a configuration example of an AC adapter provided with a switching power supply device.

FIG. 10 is a diagram showing a configuration example of an AC adapter provided with the switching power supply device 1. An AC adapter 800 includes a plug 802, a housing 804, and a connector 806. The plug 802 receives a supply of a commercial AC voltage VAC (which corresponds to the AC voltage Vac in FIG. 1) via an unillustrated electric outlet. The switching power supply device 1 is installed inside the housing 804. An output voltage VOUT (which corresponds to the output voltage Vo in FIG. 1) generated by the switching power supply device 1 is supplied to an electronic apparatus 810 via the connector 806. Examples of the electronic apparatus 810 include notebook computers, digital still cameras, digital video cameras, mobile phones, and mobile audio players.

Figure 11A:
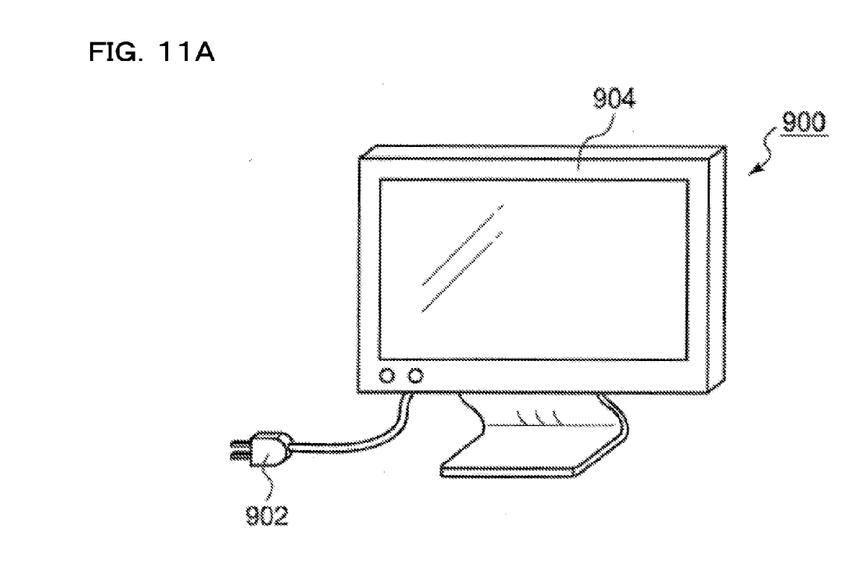
FIG. 11A is a diagram (front view) showing a configuration example of an electronic apparatus provided with a switching power supply device.
Figure 11B:
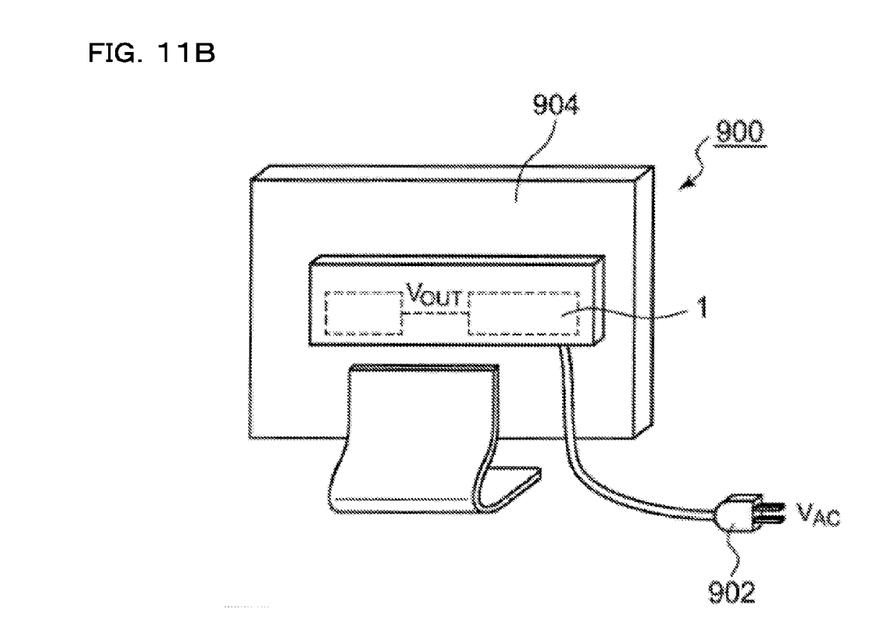
FIG. 11B is a diagram (rear view) showing the configuration example of the electronic apparatus provided with a switching power supply device.

FIG. 11A and FIG. 11B are each a diagram showing a configuration example of an electronic apparatus provided with the switching power supply device 1. FIG. 11A is a front view of an electronic apparatus 900, while FIG. 11B is a rear view of the electronic apparatus 900. The electronic apparatus 900 shown in these figures is a display device, but there is no particular limitation to the type of the electronic apparatus 900, and as long as it incorporates a power supply device, it can be an electronic apparatus of any type, such as an audio apparatus, a refrigerator, a washing machine, and an electric cleaner.

The plug 902 receives a supply of the commercial AC voltage VAC (which corresponds to the AC voltage Vac of FIG. 1) via an unillustrated electric outlet. The switching power supply device 1 is installed inside the housing 904. The output voltage VOUT (which corresponds to the output voltage Vo in FIG. 1) generated by the switching power supply device 1 is supplied to a load (a digital signal processor (DSP), a microcomputer, an illumination apparatus, an analog circuit, a digital circuit, etc.) mounted inside the housing 904.

Other Modified Examples

Besides the above embodiments, it is possible to add various modifications to the configuration of the present invention without departing from the spirit of the present invention.

For example, the above-discussed embodiments each have dealt with an insulating flyback switching power supply device as an example, but this is not meant to limit targets to which the present invention is applied, and the present invention is widely applicable to various types of switching power supply devices, regardless of whether they are insulating or not.

Moreover, although the above-discussed embodiments each have dealt with a configuration where the feedback current Ifb1 (and thus the feedback voltage Vfb) is generated by using the photo coupler 90, but this is not meant to limit the configuration of the present invention, and the configuration may be, for example, such that the feedback voltage Vfb is generated from the induction voltage Vaux that appears in the auxiliary coil 13 of the transformer 10, or such that the feedback voltage Vfb is generated from a switch voltage Vsw that appears at a connection node between the primary coil 11 and the output transistor 30.

Thus, it should be considered that the above embodiments are examples in all respects and are not limiting, and that the technical scope of the present invention is not indicated by the above description of the embodiments but by the claims, and all modifications within the scope of the claims and the meaning equivalent to the claims are covered.

INDUSTRIAL APPLICABILITY

The present invention is applicable to switching power supply devices used in various fields (including the fields of household appliances, automobiles, and industrial machines).

What is claimed is:

1. A switching power supply device comprising:
   a switching control circuit that generates a switching control signal such that a desired voltage is generated as an output voltage from an input voltage;
   a drive circuit that turns on/off an output transistor in accordance with the switching control signal; and
   an on-pulse stop circuit that generates a pulse stop signal such that a number of ON pulses of the switching control signal is reduced in a state where a load is heavier than a first threshold but is lighter than a second threshold,
   wherein the on-pulse stop circuit generates the pulse stop signal by comparing a feedback voltage in accordance with the output voltage with a threshold voltage in accordance with a time average value of the feedback voltage, and
   wherein the on-pulse stop circuit generates the threshold voltage by multiplying the time average value of the feedback voltage by a coefficient that is lamer than zero but smaller than one.

2. The switching power supply device according to claim 1, wherein the coefficient is adjustable by means of an external resistor.

3. The switching power supply device according to claim 2, wherein, in a state where the load is lighter than the first threshold, the on-pulse stop circuit puts the pulse stop signal to a logic level taken at a time of pulse suspension such that the ON pulses of the switching control signal are suspended for a plurality of cycles.

4. The switching power supply device according to claim 2, wherein, in a state where the load is heavier than the second threshold, the on-pulse stop circuit puts the pulse stop signal to a logic level taken at a time of cancellation of pulse suspension such that the number of ON pulses of the switching control signal is not reduced.

5. The switching power supply device according to claim 2, wherein the switching control circuit includes:
   an on-signal generation portion that generates an ON signal at a predetermined switching frequency;
   an off-signal generation portion that generates an OFF signal by means of output feedback control;
   a flip-flop that generates the switching control signal in accordance with the ON signal and the OFF signal; and
   a logic gate portion that masks the ON signal in accordance with the pulse stop signal.

6. The switching power supply device according to claim 1, wherein, in a state where the load is lighter than the first threshold, the on-pulse stop circuit puts the pulse stop signal to a logic level taken at a time of pulse suspension such that the ON pulses of the switching control signal are suspended for a plurality of cycles.

7. The switching power supply device according to claim 6, wherein, in a state where the load is heavier than the second threshold, the on-pulse stop circuit puts the pulse stop signal to a logic level taken at a time of cancellation of pulse suspension such that the number of ON pulses of the switching control signal is not reduced.

8. The switching power supply device according to claim 6, wherein the switching control circuit includes:
   an on-signal generation portion that generates an ON signal at a predetermined switching frequency;
   an off-signal generation portion that generates an OFF signal by means of output feedback control;
   a flip-flop that generates the switching control signal in accordance with the ON signal and the OFF signal; and
   a logic gate portion that masks the ON signal in accordance with the pulse stop signal.

9. The switching power supply device according to claim 1, wherein, in a state where the load is heavier than the second threshold, the on-pulse stop circuit puts the pulse stop signal to a logic level taken at a time of cancellation of pulse suspension such that the number of ON pulses of the switching control signal is not reduced.

10. The switching power supply device according to claim 9, wherein the switching control circuit includes:
    an on-signal generation portion that generates an ON signal at a predetermined switching frequency;
    an off-signal generation portion that generates an OFF signal by means of output feedback control;
    a flip-flop that generates the switching control signal in accordance with the ON signal and the OFF signal; and
    a logic gate portion that masks the ON signal in accordance with the pulse stop signal.

11. The switching power supply device according to claim 1, wherein the switching control circuit includes:
    an on-signal generation portion that generates an ON signal at a predetermined switching frequency;
    an off-signal generation portion that generates an OFF signal by means of output feedback control;
    a flip-flop that generates the switching control signal in accordance with the ON signal and the OFF signal; and
    a logic gate portion that masks the ON signal in accordance with the pulse stop signal.

12. The switching power supply device according to claim 1, further comprising an AC/DC conversion portion that generates the input voltage from an AC voltage.

13. An AC adapter comprising the switching power supply device according to claim 12.

14. An electronic apparatus comprising:
    the switching power supply device according to claim 1; and
    a load operable by receiving supply of the output voltage from the switching power supply device.

15. The switching power supply device according to claim 1, wherein, in a state where the load is lighter than the first threshold, the on-pulse stop circuit puts the pulse stop signal to a logic level taken at a time of pulse suspension such that the ON pulses of the switching control signal are suspended for a plurality of cycles.

16. The switching power supply device according to claim 1, wherein, in a state where the load is heavier than the second threshold, the on-pulse stop circuit puts the pulse stop signal to a logic level taken at a time of cancellation of pulse suspension such that the number of ON pulses of the switching control signal is not reduced.

* * * * *